(12) United States Patent
Robinson

(10) Patent No.: US 9,988,117 B2
(45) Date of Patent: Jun. 5, 2018

(54) TRANSITION AREA BICYCLE RACK

(71) Applicant: Marcus Robinson, Baltimore, MD (US)

(72) Inventor: Marcus Robinson, Baltimore, MD (US)

( * ) Notice: Subject to any disclaimer, the term of this patent is extended or adjusted under 35 U.S.C. 154(b) by 67 days.

(21) Appl. No.: 15/310,383

(22) PCT Filed: May 12, 2015

(86) PCT No.: PCT/US2015/030306
§ 371 (c)(1),
(2) Date: Nov. 10, 2016

(87) PCT Pub. No.: WO2015/175490
PCT Pub. Date: Nov. 19, 2015

(65) Prior Publication Data
US 2017/0240231 A1 Aug. 24, 2017

Related U.S. Application Data

(60) Provisional application No. 61/992,483, filed on May 13, 2014.

(51) Int. Cl.
A47F 7/04 (2006.01)
B62H 3/08 (2006.01)
B62H 3/00 (2006.01)

(52) U.S. Cl.
CPC ............... *B62H 3/08* (2013.01); *B62H 3/00* (2013.01); *B62H 2700/00* (2013.01)

(58) Field of Classification Search
CPC ... B62H 3/00; B62H 3/04; B62H 3/06; B62H 3/08; B62H 2700/00; B62H 2003/005
(Continued)

(56) References Cited

U.S. PATENT DOCUMENTS 20,974 A * 7/1858 Young ............... A47G 25/0664
211/196
369,494 A * 9/1887 Bailey ..................... B62H 3/08
211/20

(Continued)

FOREIGN PATENT DOCUMENTS

CH 146158 A * 3/1931 ............... B62H 3/04
FR 2211912 A5 * 7/1974 ............... B62H 3/00
(Continued)

*Primary Examiner* — Abigail E Troy
*Assistant Examiner* — Devin K Barnett

(57) ABSTRACT

A bicycle rack for use in providing temporary parking for a large number of bicycles, comprising a rail and a plurality of tire trays evenly spaced, along said rail and pivotal in motion from a parallel position to said rail to a deployed position, substantially perpendicular to said rail, each said tire tray including a recessed wheel bed for seating a wheel of a bicycle therein. "The wheel beds are adjustable to accommodate bicycles with tires of various widths. The tire trays have channels for holding printed signs. The rack is compact, modular, and stable. The rack breaks down for easy transport and storage and facilitates both, the rapid setup and breakdown of an orderly temporary parking area for a large number of bicycles. The rack is well suited for multisport races where an orderly transition area significantly enhances the profile of the event.

16 Claims, 4 Drawing Sheets

(58) Field of Classification Search
USPC .......... 211/17–24, 195, 85, 132.1, 196, 200, 211/126.1, 129.1, 130.1; 248/671, 351, 248/346.01, 346.07, 346.3
See application file for complete search history.

(56) References Cited

U.S. PATENT DOCUMENTS

| | | | | |
|---|---|---|---|---|
| 420,761 A * | 2/1890 | Bettendorf | ................ | A47F 7/04 211/24 |
| 508,627 A * | 11/1893 | MacNamar | ............... | A47F 5/13 211/130.1 |
| 577,663 A * | 2/1897 | Peace | ................ | B62H 3/04 211/195 |
| 581,585 A * | 4/1897 | Hirschman | ............... | B62H 3/04 211/21 |
| 593,728 A * | 11/1897 | Pruden | ................ | B62H 3/12 211/19 |
| 608,464 A * | 8/1898 | Lewis | ................ | B62H 3/00 211/22 |
| 639,991 A * | 12/1899 | Jewell | ................ | B60P 3/073 211/19 |
| 803,196 A * | 10/1905 | Shearman | ................ | B62H 3/08 211/20 |
| 811,393 A * | 1/1906 | Gruber | ................ | A01G 5/04 211/196 |
| 1,047,048 A * | 12/1912 | Harrison | ................ | B60P 3/075 15/DIG. 2 |
| 1,576,716 A * | 3/1926 | Casgrain | ............ | A43D 111/006 108/94 |
| 1,586,854 A * | 6/1926 | Stansfield | ................ | A47F 7/04 211/171 |
| 2,008,115 A * | 7/1935 | Taylor | ................ | A47B 49/00 105/152 |
| 2,123,695 A * | 7/1938 | Elmer | ................ | A47F 5/06 211/111 |
| 2,179,089 A * | 11/1939 | Hauf | ................ | F16L 41/00 285/189 |
| 2,197,789 A * | 4/1940 | Dalton | ................ | A47F 5/10 211/184 |
| 2,398,091 A * | 4/1946 | Gluckman | ............ | A47B 21/045 211/129.1 |
| 2,807,370 A * | 9/1957 | Kellerman | ............... | A24F 15/02 211/10 |
| 2,815,972 A * | 12/1957 | Lagervall | ................ | E04G 7/02 256/65.12 |
| 3,550,892 A * | 12/1970 | Propst | ................ | A47B 23/02 108/152 |
| 3,599,798 A | 8/1971 | Osborn | | |
| 3,653,697 A * | 4/1972 | Ernst | ................ | E04B 1/585 182/228.1 |
| 3,701,438 A * | 10/1972 | Maisnik | ................ | A47F 5/112 211/184 |
| 3,785,500 A * | 1/1974 | Kennelly | ................ | B62H 3/04 211/21 |
| 3,883,002 A | 5/1975 | Moore | | |
| 3,912,139 A * | 10/1975 | Bowman | ................ | B60R 9/00 211/22 |
| 3,942,646 A * | 3/1976 | Nelson | ................ | B62H 3/08 211/20 |
| 3,994,425 A * | 11/1976 | Graber | ................ | B60R 9/10 211/17 |
| 4,026,546 A * | 5/1977 | Omori | ................ | A63B 69/16 211/22 |
| 4,050,583 A * | 9/1977 | Szabo | ................ | B62H 3/08 211/20 |
| D263,945 S * | 4/1982 | Voegeli | ................ | D12/115 |
| D264,325 S * | 5/1982 | Griswold | ................ | D12/115 |
| 4,352,432 A * | 10/1982 | Smith | ................ | B62H 3/08 211/19 |
| 5,094,373 A * | 3/1992 | Lovci | ................ | B60R 9/06 224/282 |
| 5,169,042 A * | 12/1992 | Ching | ................ | B60R 9/06 224/497 |
| 5,246,120 A * | 9/1993 | Walker | ................ | B62H 3/12 211/19 |
| 5,417,629 A * | 5/1995 | Phipps | ................ | B62H 1/04 211/22 |
| 5,447,241 A * | 9/1995 | Bureau | ................ | B62H 3/02 211/18 |
| 5,518,159 A * | 5/1996 | DeGuevara | ............... | B60R 9/06 224/282 |
| 5,664,717 A * | 9/1997 | Joder | ................ | B60R 9/06 224/502 |
| 5,673,834 A * | 10/1997 | Cannon | ................ | B60R 9/048 224/488 |
| 5,690,260 A * | 11/1997 | Aikins | ................ | B60R 9/06 224/504 |
| D391,902 S * | 3/1998 | Pappas | ................ | D12/115 |
| D391,903 S * | 3/1998 | Pappas | ................ | D12/115 |
| 5,743,411 A * | 4/1998 | Hawkes | ................ | B62H 3/04 211/19 |
| 5,749,474 A | 5/1998 | Woodcock | | |
| 5,884,826 A * | 3/1999 | Shaver | ................ | B60R 9/06 211/195 |
| 6,491,195 B1 * | 12/2002 | McLemore | ............... | B60R 9/06 224/521 |
| 6,679,388 B1 * | 1/2004 | Chiu | ................ | B62H 3/12 211/22 |
| 6,695,268 B1 | 2/2004 | Hsieh | | |
| 7,021,461 B1 * | 4/2006 | Robey | ................ | B60P 3/07 206/335 |
| 7,240,816 B2 * | 7/2007 | Tsai | ................ | B60R 9/06 211/195 |
| 7,261,229 B1 * | 8/2007 | Allen | ................ | B60R 9/06 224/495 |
| D585,793 S * | 2/2009 | Skalka | ................ | B62H 3/08 D12/115 |
| 7,510,359 B2 | 3/2009 | Sperry et al. | | |
| 7,784,622 B2 * | 8/2010 | Bernard | ................ | B62H 3/08 211/20 |
| D669,398 S * | 10/2012 | Parkins | ................ | D12/115 |
| 8,413,824 B2 * | 4/2013 | Cabassa | ................ | B62B 3/104 211/195 |
| 8,418,902 B2 * | 4/2013 | Cha | ................ | B60R 9/10 224/488 |
| D737,196 S * | 8/2015 | Pappas | ................ | D12/407 |
| 9,180,821 B1 * | 11/2015 | Freet | ................ | B60R 9/10 |
| D759,570 S * | 6/2016 | Pappas | ................ | D12/407 |
| 9,555,744 B1 * | 1/2017 | Roth | ................ | B60R 9/10 |
| 2005/0061842 A1 | 3/2005 | Tsai | | |
| 2006/0091096 A1 * | 5/2006 | Velez | ................ | B62B 3/002 211/194 |
| 2007/0256989 A1 * | 11/2007 | Steadman | ................ | B62H 3/06 211/21 |
| 2009/0120984 A1 * | 5/2009 | Sautter | ................ | B60R 9/06 224/497 |
| 2011/0108592 A1 * | 5/2011 | Lee | ................ | B60R 9/06 224/488 |
| 2012/0241392 A1 * | 9/2012 | Combs | ................ | B60B 29/001 211/21 |
| 2013/0270201 A1 * | 10/2013 | Vineyard | ................ | B62H 3/06 211/21 |
| 2015/0083679 A1 * | 3/2015 | Meers | ................ | A47F 5/0025 211/85.4 |
| 2015/0224837 A1 * | 8/2015 | Anyan | ................ | B60R 9/10 280/504 |
| 2016/0280296 A1 * | 9/2016 | Greenblatt | ................ | B62H 3/00 |
| 2017/0197557 A1 * | 7/2017 | Arvidsson | ................ | B60R 9/10 |
| 2017/0369114 A1 * | 12/2017 | Hyde | ................ | B62H 3/12 |

FOREIGN PATENT DOCUMENTS

| | | | | |
|---|---|---|---|---|
| JP | 2007247270 A * | 9/2007 | ............... | B62H 3/04 |
| JP | 2009-262600 | 11/2009 | | |

* cited by examiner

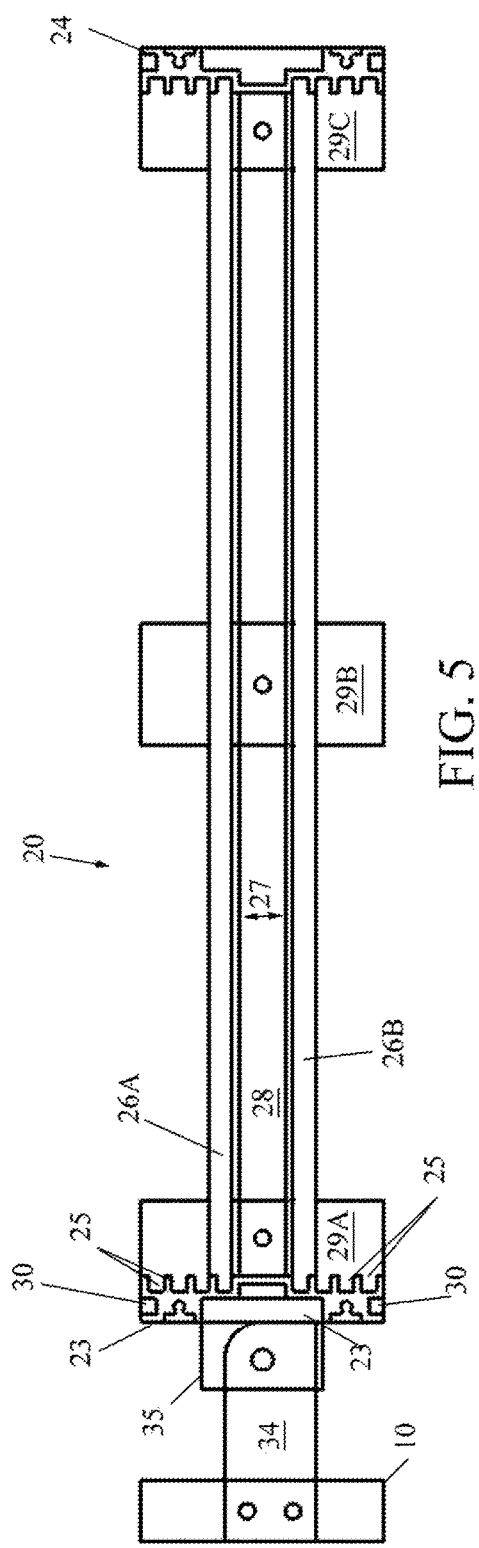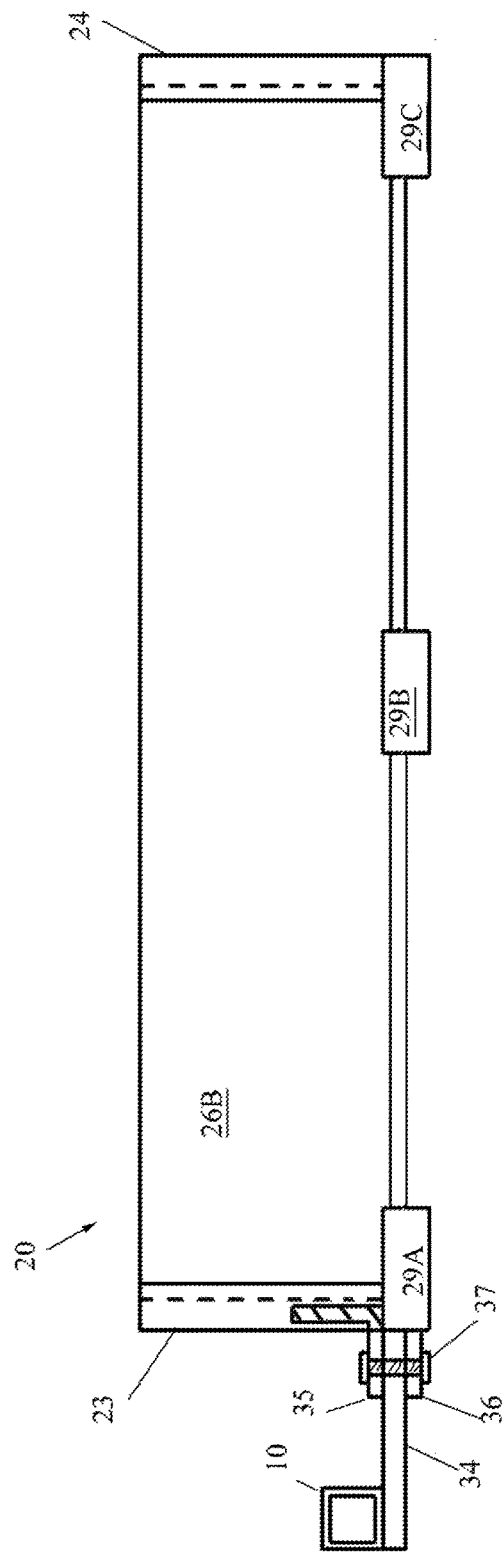

ively park their bicycles before and after they compete in the cycling stage of the race. This area is commonly referred to as the "Transition Area" and consists of several rows of bicycle racks.

TRANSITION AREA BICYCLE RACK

BACKGROUND OF THE INVENTION

1. Field of the Invention

The present invention relates to bicycle racks in general, and more particularly to a modular bicycle rack that folds for easy transport and storage, provides a separate space to park each bicycle, accommodates bicycles with tires of various widths, and displays printed signs.

2. Description of Prior Art

A multisport race is an event where athletes compete for the best overall time by quickly transitioning between at least two different sports on a course consisting of a continuous series of stages. Multisport races that incorporate the sport of cycling require an orderly area where athletes can temporarily park their bicycles before and after they compete in the cycling stage of the race. This area is commonly referred to as the "Transition Area" and consists of several rows of bicycle racks.

Existing bicycle racks that provide temporary parking lot a large number of bicycles in the transition area of multisport races fall into one of two categories: 1) the tinkertoy-like "suspension" variety; or 2) the pallet-like "wheel-based" variety.

The typical suspension bicycle rack, like the one shown in FIG. 1, consists of a horizontal pole supported by two shorter poles inserted through each end, on which bicycles hang by their seat or handlebars. While easy to transport and store, such suspension bicycle racks do not display printed signs and lack a separate space to park each bicycle, which inevitably results in the suspended bicycles shifting around and becoming entangled.

Alternatively, another commonly used wheel-based bicycle rack is typically made of wood, similar to a shipping palette, and holds bicycles in an upright position by the front or rear wheel. While these provide a separate space to park each bicycle, these bicycle racks do not break down for easy transport and storage and do not adjust to bicycles with tires of various widths.

There is a need for a bicycle rack that combines the advantages of both types of existing bicycle racks described above, namely a bicycle rack that breaks down for easy transport and storage, provides a separate space to park each bicycle, adjusts to bicycles with tires of various widths, and displays printed signs.

SUMMARY OF THE INVENTION

It is an object of the invention to provide a compact, modular, and stable bicycle rack that is easy to transport and store.

Another object of the invention is to provide a bicycle rack that provides separate spaces to park bicycles in an upright position, supported by the front or rear wheel.

It is another object of the invention to provide a bicycle rack that adjusts to bicycles having tires of various widths.

It is another object of the invention to provide a bicycle rack that displays printed signs.

It is another object of the invention to provide a bicycle rack that can be joined side by side and end-to-end to park any desired number of bicycles temporarily.

In accordance with the objects described above, the present invention provides a compact, modular, and stable bicycle rack that comprises a series of tire trays evenly spaced and pivotally mounted to a central rail, which makes the rack easy to transport and store and facilitates both the rapid setup and breakdown of an orderly temporary parking area for a large number of bicycles. Each tire tray is configured to support a bicycle in an easily accessible upright position by the front or rear wheel and, when deployed for use, pivots away from, and perpendicular to, the central rail, thereby providing a separate space to park a bicycle, which prevents bicycles from becoming entangled with one another. Additionally, each tire tray is configured to adjust to bicycles with tires of various widths. The tire trays include two panels that adjust laterally for narrow or wide tires. The tire trays also include small channels to display printed signs. For transport, the tire trays pivot inward to a compact stowed position that is parallel with the rail.

These and other objects, features, and advantages of the present invention will become readily apparent upon further review of the following specifications and drawings.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 5 is a top view of the tire tray 20 of FIGS. 2-4.

FIG. 6 is a side cross section of the bike rack 2 of FIGS. 2-4.

DETAILED DESCRIPTION OF THE PREFERRED EMBODIMENTS

The present invention is an improved bicycle rack for parking numerous bicycles, with tires of various widths, in the transition area of multisport races. The folding bicycle rack breaks down for easy transport and storage.

Figure 1:
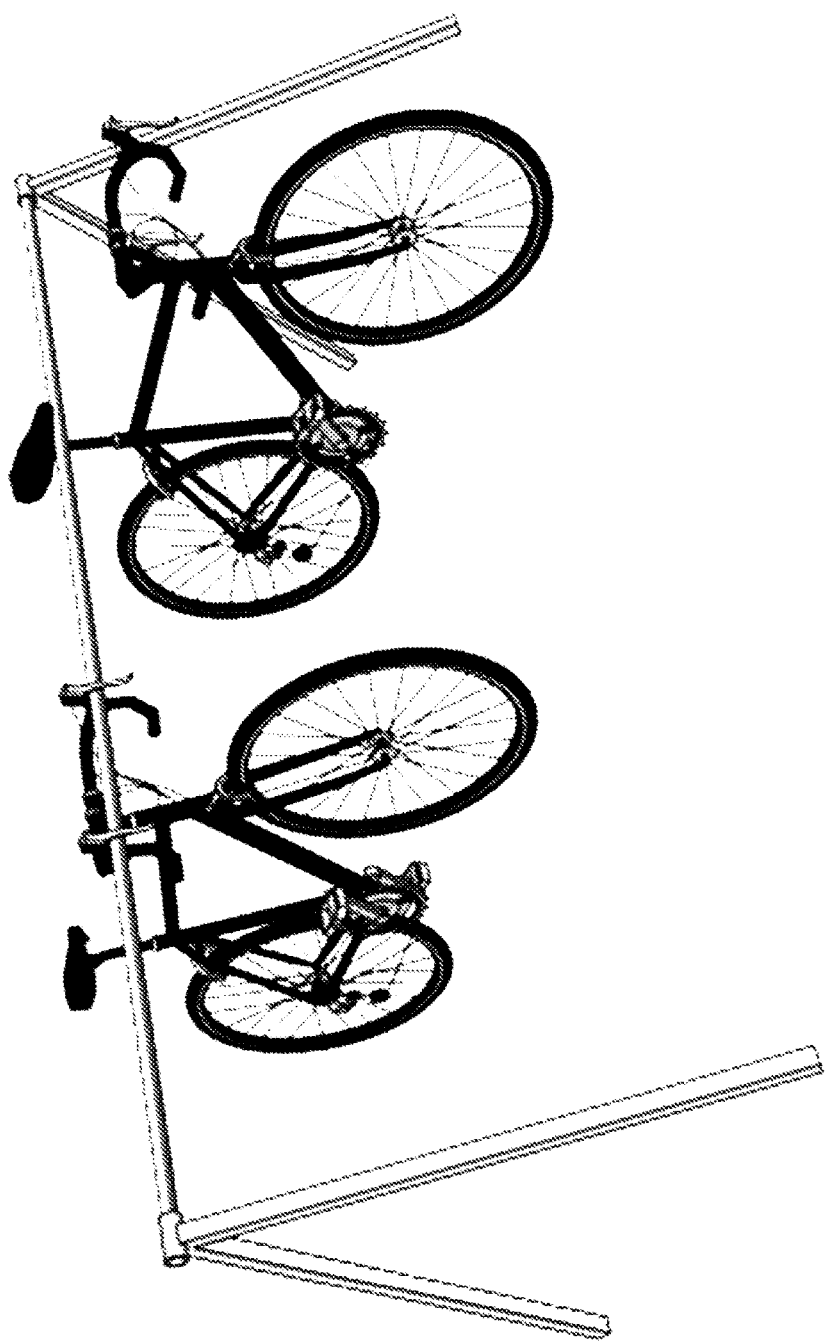
FIG. 1 is a perspective view of a prior art suspension-tape transition area bicycle rack.
Figure 2:
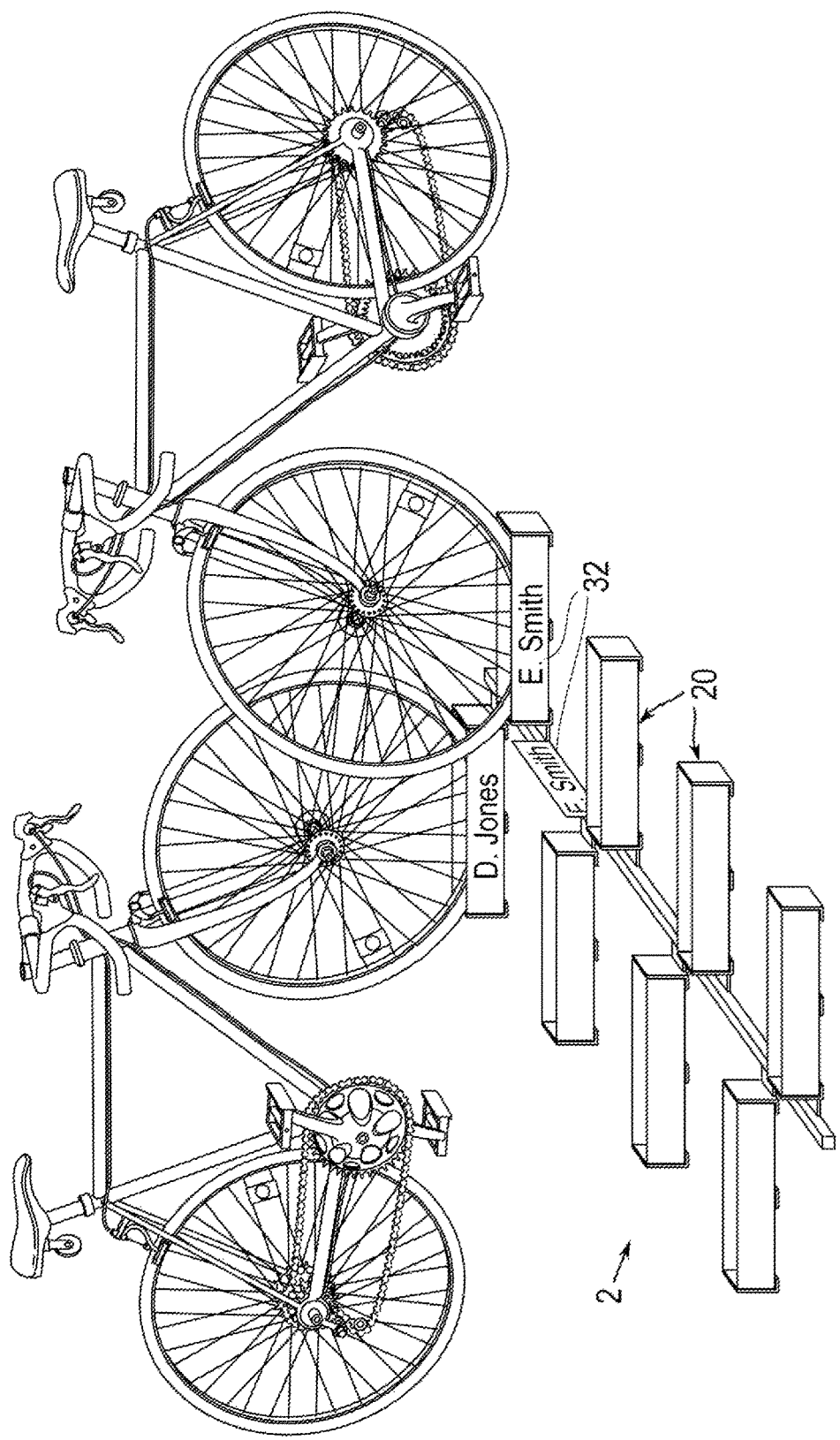
FIG. 2 is a side-perspective view of a folding bicycle rack 2 according to a first embodiment of the present invention.

FIG. 2 is a side-perspective view of the folding bicycle rack 2 according to a first embodiment of the present invention, which generally comprises a plurality at tire trays 20 evenly spaced and pivotally mounted to a central rail 10. The tire trays 20 pivot away from, and towards, rail 10 from a parallel position relative to rail 10, to a perpendicular deployed position. The central rail 10 may be any length as a matter of design choice and may contain any number of tire trays 20. However, in a preferred embodiment an equal number of tire trays 20 are uniformly-spaced along each side of central rail 10. In the illustrated embodiment four tire trays 20 are pivotally mounted on each of the opposing sides of central rail 10 for a total of eight.

Figures 3, 4:
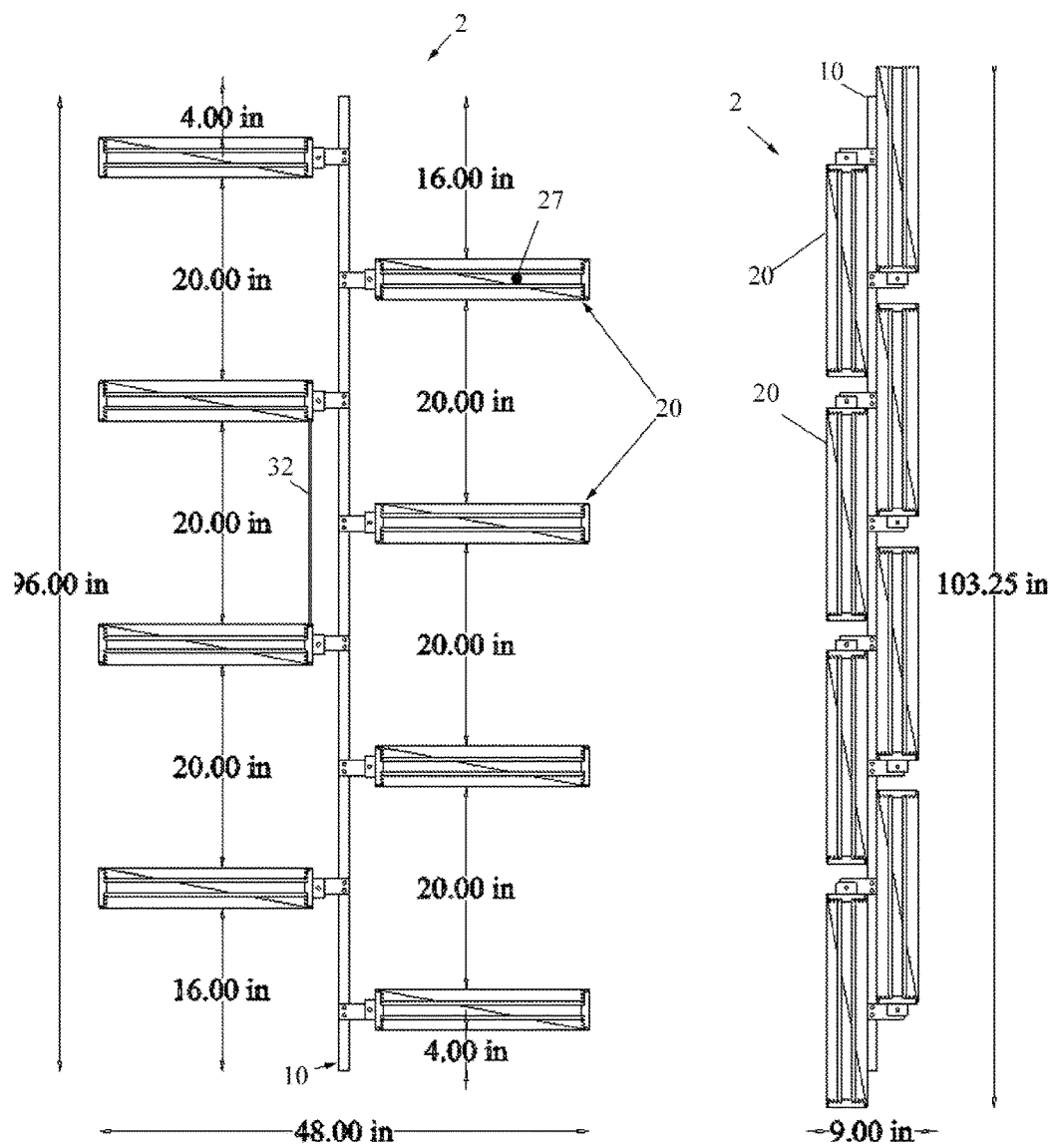
FIG. 3 is a top view of the rack 2 of FIG. 2 in a deployed position.
FIG. 4 is a top view of the rack 2 of FIGS. 2-3 in a folded position.

FIG. 3 is a top view of the rack 2 in a deployed position and FIG. 4 in a folded position, with exemplary dimensions shown.

When deployed, as shown in FIG. 3, each tire tray 20 projects perpendicularly outward from central rail 10, each seating one bicycle wheel (front or back) in an intermediate space 27. As illustrated, a first group of tire trays 20 pivots from the left side of central rail 10, and a second group of tire trays 20 pivots from the right side. Along each side the tire trays 20 are equidistant from each other at a distance N of approximately 20". The first group is offset along central rail 10 such that a topmost tray 20 is a fraction N/2+M from the end of central rail 10, where M is an interger between 0 and N. The bottommost tray 20 is a fraction N/2−M from the opposing end of central rail 10. Thus, in the illustrated embodiment the central rail 10 is 1" wide and 96" long, and each tire tray 20 protrudes 24" outward. The spacing N equals 20", and M equals 6 such that topmost tray 20 is 16" from the end of central rail 10, and the bottommost tray 20 is 4" from the opposing end of central rail 10. This configuration of tire trays 20 maintains standing stability of the bicycles and effectively spaces the bicycles N=20" apart when deployed to prevent entanglement, and provides just enough spacing so that each tire trays 20 folds neatly into the intra-tray space. Moreover, as will be described, the width of each intermediate space 27 may be adjusted for narrow or wide tires.

Pivoting each tire tray 20 to its parallel stowed configuration (FIG. 4 minimizes bulk and facilitates storage and transport of many such racks 2 to and from the transition area.

FIG. 5 is a top view of the tire tray 20 of FIGS. 2-4. Each tire tray 20 comprises an elongate trough-shaped member defined by an open-topped bed along its length. The ends of the bed are bordered by upright brackets 23, 24 both having a series of inwardly facing vertical open-ended channels 25. Upright brackets 23, 24 may be formed in this configuration by extruding aluminum. The sides of the bed are bordered by two rectangular panels 26A, 26B that slide within two vertical open-ended channels 25 on opposing sides of each tire tray 20. The panels 26A, 26B have distal flanges that slide into any one of channels 25 on each end of the tire tray 20. The panels 26A, 26B define an intermediate space 27 for seating and constraining the bicycle wheel. Moving the panels 26A, 26B into different channels 25 changes the distance between the panels 26A, 26B and the width of intermediate space 27, thereby making it possible for the tire tray 20 to accommodate bicycles with tires of various widths. In addition, the flanges are offset to one side of each panel 26A, 26B such that inverting each panel 26A, 26B results in a slightly different width of intermediate space 27. The channels 25 (here four) on each side in combination with the invertible panels 26A, 26B yields several different widths of intermediate space 27, which is sufficient to conform to and seat all traditional bicycle tire widths ranging from 1" to 3.25". The bottom of the bed is defined by an elongate strut 28 running end to end between the upright brackets 23, 24 and secured there beneath by screws or weldment to the upright brackets 23, 24. In addition, a plurality (e.g., three) rectangular feet 29A-C are secured cross-wise to strut 28, at each end and to the center of the strut 28, by screws or weldment to provide ground support and constraint for each panel 26A, 26B within its selected channel 25. The skeletal configuration of strut 28 with feet 29A-C minimizes bulk and weight.

Note that the outer edges of brackets 23, 24 are defined by small channels 30 designed to hold printed signs 32 (see FIG. 2) cross-wise extending side-to-side between adjacent tire trays 20 when the bicycle rack 2 is in its deployed configuration (see also, FIGS. 2-3). In addition, the outermost channels 25 in each upright bracket 23, 24 may likewise be used to hold printed signs 32 extending along each tire tray 20 on both sides. Signs 32 are preferably rectangular cutouts of corrugated plastic imprinted with the user's name and/or a motivational message or the like. In addition to their signage value, signs 32 provide a convenient reinforcement for temporally locking the tire trays 20 in their deployed positions as seen in FIG. 3.

FIG. 6 is a side cross section of the rack 2 of FIGS. 2-4.

In each case the tire tray 20 is pivotally mounted to the central rail 10 at an offset pivot point, and in a manner that limits the pivotal arc of the tire tray 20 and prevents over-pivoting beyond perpendicular. This configuration constrains the tire trays 20 to movement between stowed and deployed positions and indexes the deployed position. In the illustrated embodiment, this is achieved by securing a pivot bracket 34 to the central rail 10. The pivot bracket is a flat strut preferably secured by screws or weldment beneath the central rail 10 and extending a short distance (e.g., 2") perpendicularly outward to the tire tray 20 pivot point. The pivot bracket 34 is pivotally mounted to an angle bracket 35 that is secured to the inner upright bracket 23. As shown, the angle bracket 35 is preferably seated flush within a groove in upright bracket 23 and is fixedly attached thereto, and angles atop the pivot bracket 34. A lower reinforcement plate 36 sandwiches the pivot bracket 34, and the angle bracket 35 and reinforcement plate 36 are held together by a double-headed pivot pin 37 that allows the entire tire tray 20 to pivot on pivot bracket 34. As seen in FIG. 5, one inner edge of the pivot bracket 34 is rounded and one is not, thereby allowing the tire tray to pivot in one direction only (toward the rounded edge), and indexing the perpendicular deployed position when pivot bracket 34 abuts angle bracket 35. This allows quick and easy setup and breakdown, minimizes bulk when carrying, and facilitates storage and transport of many such racks 2 to and from the transition area.

Moreover, the offset spacing of the topmost tray 20 front the end of central rail 10, versus the bottommost tray 20 from the opposing end of central rail 10 allows multiple bicycle racks 2 to be placed end-to-end to accommodate as many riders as desired. For this purpose, if desired, the central rails 10 may be provided with interlocking joints or collars (not shown) to secure them together.

It should now be apparent that the bicycle rack 2 described above is compact, modular, and stable. The rack 2 breaks down for easy transport and storage, and facilitates both the rapid setup and breakdown of an orderly temporary parking area for a large number of bicycles.

The bicycle rack 2 provides a separate space to park each bicycle, adjusts to bicycles with tires of various widths, and displays printed signs.

Moreover, any number of racks 2 can be joined side-by-side and end-to-end to park any desired number of bicycles temporarily.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

INDUSTRIAL APPLICABILITY

The invention provides an improved bicycle rack especially adapted for the transition area of multi-sport events such as triathlons and duathlons. The present bicycle rack breaks down for easy transport and storage, provides a separate space to park each bicycle, adjusts to bicycles with tires of various widths, and displays printed signs.

What is claimed is:

1. A bicycle rack for use in providing temporary parking for bicycles, comprising:

a rail; and
a plurality of tire trays evenly spaced along said rail, wherein the trays are each evenly spaced along the rail and pivotably attached to the rail to pivot from a parallel position to said rail to a deployed position substantially perpendicular to said rail, each said tire tray including a generally flat bottom bed with upright brackets extending perpendicularly from the bottom bed at opposed ends of the bed, and a pair of side panels; wherein each upright bracket includes a plurality of grooves, and each side panel is configured to be inserted into a corresponding pair of grooves between the respective brackets in order to define a width of the tray so that a wheel of a bicycle is capable to be seated within the tray between the brackets and the side panels.

2. The bicycle rack of claim 1, wherein the width of the trays are each adjustable to accommodate bicycles with tires of various widths.

3. The bicycle rack of claim 1, wherein a corresponding pair of grooves on a respective pair of the opposed brackets is configured to receive a printed sign.

4. The bicycle rack of claim 1, wherein said plurality of tire trays are pivotally connected to said rail at a plurality of pivot joints each configured to index pivoting to said substantially perpendicular position.

5. A portable bicycle rack, comprising: an elongate central rail;
a plurality of tire trays each pivotally mounted at one end to said rail, a first group of said plurality of tire trays being mounted on one side of said rail and pivotable from a first position substantially parallel to said rail to a second position substantially perpendicular to said rail, and a second group of said plurality of tire trays being mounted on an opposing side of said rail and pivotable from a substantially parallel position to a substantially perpendicular position,
each said tire tray including a generally flat bottom bed with upright brackets extending perpendicularly from the bottom bed at opposed ends of the bed, and a pair of side panels; wherein each upright bracket includes a plurality of grooves, and each side panel is configured to be inserted into a corresponding pair of grooves between the respective brackets in order to define a width of the tray so that a wheel of a bicycle is capable to be seated within the tray between the brackets and the side panels.

6. The portable bicycle rack according to claim 5, wherein said first group of said plurality of tire trays is equal in number to said second group of said plurality of tire trays.

7. The portable bicycle rack according to claim 6, wherein said first group of said plurality of tire trays consists of four tire trays.

8. The portable bicycle rack according to claim 5, wherein said pair of side panels are adjustably attached to said upright brackets to define a variable intermediate space.

9. The portable bicycle rack according to claim 5, wherein each of said tire trays are constrained to pivot approximately 90 degrees.

10. The portable bicycle rack according to claim 5, wherein said plurality of tire trays are pivotally connected to said rail at a plurality of pivot joints each configured to index, pivoting to said, substantially perpendicular position.

11. The portable bicycle rack according to claim 10, wherein said pair of side panels are removably attached to said upright brackets.

12. A portable bicycle rack, comprising: an elongate central rail; and a plurality of tire trays each pivotally mounted, at one end to said rail, a first group of said plurality of tire trays being mounted on one side of said rail and pivotable from a first position substantially parallel to said rail to a second position substantially perpendicular to said rail extending on said one side, and a second group of said plurality of tire trays being mounted on an opposing side of said rail and pivotable therefrom from a substantially parallel position to a substantially perpendicular position extending on said other side, all of said tire trays comprising a flat elongate bed with upright brackets extending perpendicularly therefrom at opposing ends, and a pair of side panels removably attached to said upright brackets, each pair of side panels being adjustably attached to said upright brackets along widths of the brackets to define a variable intermediate space for receiving bicycles with tires of various widths therein.

13. The portable bicycle tack according to claim 12, wherein said first group of said plurality of tire trays is equal in number to said second group of said plurality of tire trays.

14. The portable bicycle rack according to claim 13, wherein said first group of said plurality of tire trays consists of four tire trays.

15. The portable bicycle rack according to claim 13, wherein each said upright bracket comprises a plurality of vertical notches for receiving said side panels.

16. The portable bicycle rack according to claim 12, wherein each of said tire trays are constrained to pivot approximately 90 degrees.

\* \* \* \* \*